(12) United States Patent
Lei et al.

(10) Patent No.: US 12,405,778 B2
(45) Date of Patent: *Sep. 2, 2025

(54) APPLICATION PORTING METHOD AND APPARATUS, DEVICE, AND MEDIUM

(71) Applicant: Tencent Technology (Shenzhen) Company Limited, Shenzhen (CN)

(72) Inventors: Danxiong Lei, Shenzhen (CN); Weizhou Jiang, Shenzhen (CN); Zhaowei Wang, Shenzhen (CN); Qiang Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,306

(22) Filed: Feb. 9, 2024

(65) Prior Publication Data

US 2024/0192939 A1    Jun. 13, 2024

Related U.S. Application Data

(63) Continuation of application No. 17/725,427, filed on Apr. 20, 2022, now Pat. No. 11,934,814, which is a
(Continued)

(30) Foreign Application Priority Data

Jun. 3, 2020 (CN) .................. 202010494866.8

(51) Int. Cl.
*G06F 8/51* (2018.01)
*G06F 8/36* (2018.01)
*G06F 9/445* (2018.01)

(52) U.S. Cl.
CPC ................ *G06F 8/51* (2013.01); *G06F 8/36* (2013.01); *G06F 9/44526* (2013.01)

(58) Field of Classification Search
CPC .......... G06F 8/51; G06F 8/36; G06F 9/44526; G06F 8/76
(Continued)

(56) References Cited

U.S. PATENT DOCUMENTS 6,643,652 B2   11/2003   Helgeson et al.
8,443,349 B2    5/2013   Papakipos et al.
(Continued)

FOREIGN PATENT DOCUMENTS

CN    106569900 A    4/2017
CN    107179916 A    9/2017
(Continued)

OTHER PUBLICATIONS

Saurez, Enrique, et al. "Incremental deployment and migration of geo-distributed situation awareness applications in the fog." Proceedings of the 10th ACM International Conference on Distributed and Event-based Systems. 2016. pp.258-269. (Year: 2016).*
(Continued)

*Primary Examiner* — Satish Rampuria
(74) *Attorney, Agent, or Firm* — Morgan, Lewis & Bockius LLP

(57) ABSTRACT

A method of porting a first application, corresponding to a third-party development tool, into a second application, corresponding to a sub-application that depends on a parent application to run, is performed by an electronic device. The device transforms the first application from a first project mechanism into a second project mechanism. The device converts a design resource in the transformed first application from a first resource format into a second resource format. The device exports the design resource to a devel-
(Continued)

opment tool of the sub-application. The device converts a code resource in the transformed first application from a first programming language into a second programming language. The device exports the code resource to the development tool of the sub-application, The device also performs secondary development on the design resource and the code resource in the development tool of the sub-application.

15 Claims, 6 Drawing Sheets

Related U.S. Application Data continuation of application No. PCT/CN2021/094024, filed on May 17, 2021.

(58) Field of Classification Search
USPC .................................................. 717/120–178
See application file for complete search history.

(56) References Cited

U.S. PATENT DOCUMENTS

| | | | | |
|---|---|---|---|---|
| 8,621,428 | B2* | 12/2013 | Massoudi | G06F 8/31 717/121 |
| 9,152,449 | B2* | 10/2015 | Deng | G06F 9/45558 |
| 9,442,744 | B2* | 9/2016 | Lerum | G06F 9/454 |
| 9,588,743 | B2 | 3/2017 | Massoudi et al. | |
| 11,789,706 | B2 | 10/2023 | Ramanathan | |
| 2007/0256058 | A1* | 11/2007 | Marfatia | G06F 8/51 717/137 |
| 2010/0083222 | A1* | 4/2010 | Maximilien | G06F 8/20 717/121 |
| 2012/0266129 | A1 | 10/2012 | Massoudi et al. | |
| 2014/0344625 | A1 | 11/2014 | Thatte et al. | |
| 2015/0234642 | A1* | 8/2015 | Araya | G06F 8/51 717/137 |
| 2016/0070547 | A1* | 3/2016 | Ramanathan | G06F 8/77 717/107 |
| 2018/0018168 | A1 | 1/2018 | Jiao et al. | |
| 2018/0081962 | A1* | 3/2018 | Obitko | G06F 16/31 |
| 2019/0228136 | A1* | 7/2019 | Shakespeare | G06F 21/128 |

FOREIGN PATENT DOCUMENTS

| | | |
|---|---|---|
| CN | 108089983 A | 5/2018 |
| CN | 108108205 A | 6/2018 |

OTHER PUBLICATIONS

Satoh, Ichiro. "MobileSpaces: A framework for building adaptive distributed applications using a hierarchical mobile agent system." Proceedings 20th IEEE International Conference on Distributed Computing Systems. IEEE, 2000. pp. 161-168. (Year: 2000).*
Kounavis, Michael E., et al. "The genesis kernel: A programming system for spawning network architectures." IEEE Journal on Selected Areas in Communications 19.3 (2001): pp. 511-526. (Year: 2001).*
Wang, Long, et al. "Reliability microkernel: Providing application-aware reliability in the os." IEEE Transactions on Reliability 56.4 (2007): pp. 597-614. (Year: 2007).*
Devine, Karen, et al. "Zoltan data management services for parallel dynamic applications." Computing in Science & Engineering 4.2 (2002): pp. 90-96. (Year: 2022).*
Kim, Hyojoon, and Nick Feamster. "Improving network management with software defined networking." IEEE Communications Magazine 51.2 (2013): pp. 114-119. (Year: 2013).*
Dominique Guinard, "A Web of Things Application Architecture: Integrating the Real-World into the Web", Dissertation submitted to ETH Zurich, Degree of Doctor of Science, 2011, 245 pgs.
Howard Gardner et al., "The App Generation: How Today's Youth Navigate Identity, Intimacy, and Imagination in a Digital World", Yale University Press, 2013, 8 pgs.
Hyojoon Kim et al., "Improving Network Management with Software Defined Networking", IEEE Communications Magazine 51.2, 2013, 6 pgs.
Karen Devine et al., "Zoltan Data Management Services for Parallel Dynamic Applications", Computing in Science & Engineering 4.2, 2002, 8 pgs.
Linh Manh Pham et al., "Roboconf: A hybrid Cloud Orchestrator to Deploy Complex Applications", 2015 IEEE 8th International Conference on Cloud Computing, IEEE, 2015, 8 pgs.
Ozan Necati Günalp, "Continuous Deployment of Pervasive Applications in Dynamic Environments", Ubiquitous Computing, Universite de Grenoble, Oct. 13, 2015, 272 pgs.
Tencent Technology, ISRWO, PCT/CN2021/094024, Aug. 20, 2021, 7 pgs.
Tencent Technology, IPRP, PCT/CN2021/094024, Dec. 6, 2022, 6 pgs.

* cited by examiner

APPLICATION PORTING METHOD AND APPARATUS, DEVICE, AND MEDIUM

CROSS-REFERENCE TO RELATED APPLICATIONS

This application is a continuation application of U.S. patent application Ser. No. 17/725,427, entitled "APPLICATION PROGRAM TRANSPLANTATION METHOD AND APPARATUS, DEVICE, AND MEDIUM" filed on Apr. 20, 2022, which is a continuation application of PCT Patent Application No. PCT/CN2021/094024, entitled "APPLICATION PROGRAM TRANSPLANTATION METHOD AND APPARATUS. DEVICE, AND MEDIUM" filed on May 17, 2021, which claims priority to Chinese Patent Application No. 202010494866.8, filed with the State Intellectual Property Office of the People's Republic of China on Jun. 3, 2020, and entitled "APPLICATION PORTING METHOD AND APPARATUS, DEVICE, AND MEDIUM", all of which are incorporated herein by reference in their entirety.

FIELD OF THE TECHNOLOGY

Embodiments of this application relate to the field of virtual environments, and in particular, to an application porting method and apparatus, a device, and a medium.

BACKGROUND OF THE DISCLOSURE

A sub-application is a program that depends on a parent application to run. A sub-application is also referred to as an applet. When the parent application has been installed on an electronic device, the applet does no need to be downloaded and installed manually in the electronic device by a user, and only needs to be automatically downloaded and installed after the user clicks an icon in the parent application. A small game (e.g., a mini-game) is a category of the applet, which provides a convenient click-to-play experience.

Many games are developed by third-party engines and therefore cannot be run directly on a small game platform. When a game developed by a third-party engine wants to run on the small game platform, the developer needs to re-develop the game on the small game platform.

Re-developing the game with the same game content on the small game platform wastes the development result in the early stage and results in an unnecessary waste of resources.

SUMMARY

Embodiments of this application provide an application porting method and apparatus, a device, and a medium, so that the first application developed by the third-party development tool can be rapidly ported (e.g., transplanted, migrated, etc.) to the second application in the form of a sub-application. The technical solutions are as follows:

According to an aspect of the embodiments of this application, an application porting method is provided, used for porting a first application into a second application. The first application corresponds to a third-party development tool. The second application corresponds to a sub-application that depends on a parent application to run. The method is performed by an electronic device and includes:

transforming the first application from a first project mechanism in the third-party development tool into a second project mechanism;

converting a design resource in the transformed first application from a first resource format into a second resource format, and exporting the design resource to a development tool of the sub-application;

converting a code resource in the transformed first application from a first programming language into a second programming language, and exporting the code resource to the development tool of the sub-application; and performing secondary development on the design resource and the code resource in the development tool of the sub-application, to obtain the second application, the first project mechanism, the first resource format, and the first programming language corresponding to the third-party development tool, and the second project mechanism, the second resource format, and the second programming language corresponding to the sub-application.

According to another aspect of this application, an application porting apparatus is provided, configured to port a first application into a second application, the second application being a sub-application depending on a parent application to run, and the apparatus including:

a transformation module, configured to transform the first application into a second project mechanism from a first project mechanism in a third-party development tool;

a design export module, configured to convert a design resource in the transformed first application into a second resource format from a first resource format, and export the design resource to a development tool of the sub-application;

a code export module, configured to convert a code resource in the transformed first application into a second programming language from a first programming language, and export the code resource to the development tool of the sub-application; and a secondary development module, configured to perform secondary development on the design resource and the code resource in the development tool of the sub-application, to obtain the second application, the first project mechanism, the first resource format, and the first programming language corresponding to the third-party development tool, and the second project mechanism, the second resource format, and the second programming language corresponding to the sub-application.

According to another aspect of this application, a computer device is provided, including: a processor and a memory, the memory storing at least one instruction, at least one program, a code set, or an instruction set, the at least one instruction, the at least one program, the code set, or the instruction set being loaded and executed by the processor to implement the application porting method described in the foregoing aspect.

According to another aspect of this application, a non-transitory computer-readable storage medium is provided, storing at least one instruction, at least one program, a code set, or an instruction set, the at least one instruction, the at least one program, the code set, or the instruction set being loaded and executed by a processor to implement the application porting method described in the foregoing aspect.

According to another aspect of this application, a computer program product is provided, configured to: when executed on a data processing system comprising a processor and a memory, cause the data processing system to perform the method in the foregoing aspect.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
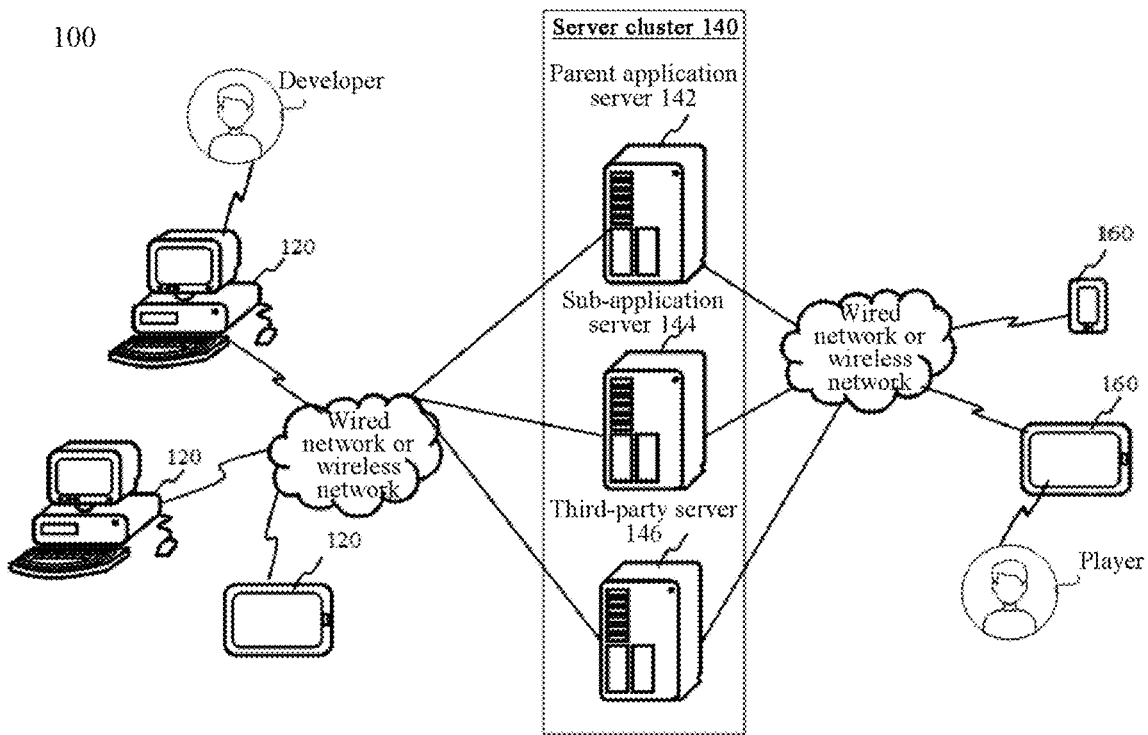
FIG. 1 is a structural block diagram of a computer system according to an exemplary embodiment of this application.

FIG. 1 is a structural block diagram of a computer system 100 according to an exemplary embodiment of this application. The computer system 100 includes: one or more first terminals 120, one or more server clusters 140, and one or more second terminals 160.

The first terminal 120 may be an electronic device used by a developer. The first terminal 120 may be a mobile phone, a tablet computer, an e-book reader, a Moving Picture Experts Group Audio Layer III (MP3) player, a Moving Picture Experts Group Audio Layer IV (MP4) player, a laptop portable computer, a desktop computer, or the like.

Figure 2:
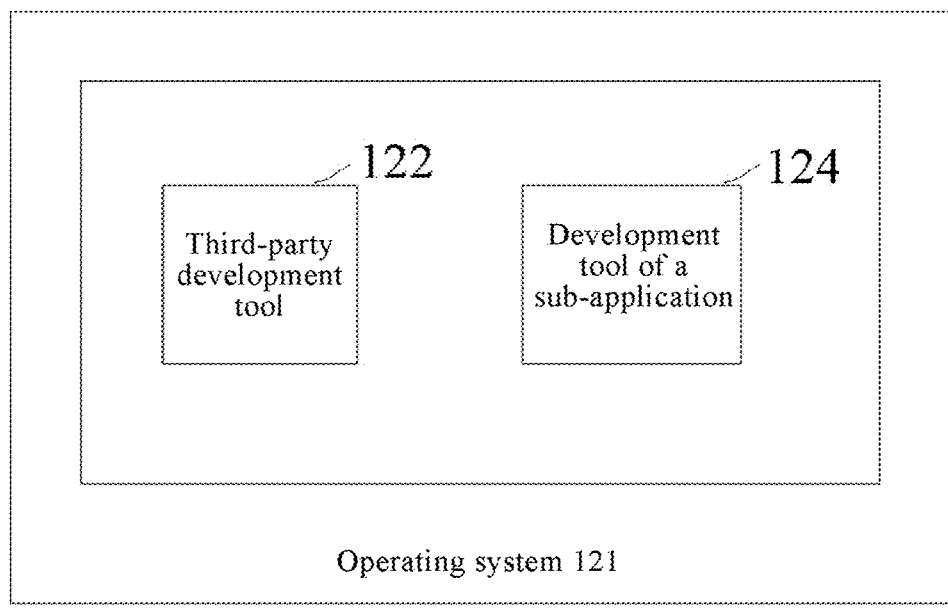
FIG. 2 is a schematic structural diagram of a first terminal according to an exemplary embodiment of this application.

It may be learned from a structure of the first terminal shown in FIG. 2 that an operating system 121 of the first terminal 120 is installed with a third-party development tool 122 and a development tool 124 of a sub-application. The third-party development tool 122 is also referred to as a third-party development engine. The third-party development tool 122 is a component or a function in a game engine. The game engine includes but not limited to: a Unity engine, a Cocos engine, a Laya engine, an Unreal engine, an Egret engine, a Three.js engine, a PixiJS engine, or the like. The "third-party" herein refers to a third party other than a platform side and a game developer of the sub-application, that is, a development engine side. The development tool 124 of the sub-application is a development tool used for developing the sub-application.

The first terminal 120 is connected to the server cluster 140 by a wired network or a wireless network.

The second terminal 160 may be an electronic device used by a player user. The second terminal 160 may be a mobile phone, a tablet computer, an e-book reader, an MP3 player, an MP4 player, a laptop portable computer, a desktop computer, or the like. An operating system of the second terminal 160 may be a Windows system, an Android system, or an IOS system.

A parent application and a sub-application are installed and run in the second terminal 160. The parent application may be any one of an instant messaging program (e.g., application), a social networking application, a payment program, an electronic shopping program, a system management program, a security management program, an anti-virus program, a network disk program, a file manager program, or a desktop optimization program. Herein, an example in which the second terminal 160 is an instant messaging program is used for description. The sub-application is a program depending on the parent application to run, also referred to as an applet.

The server cluster 140 may be any one of a plurality of servers, a virtual cloud storage, or a cloud computing center. The server cluster 140 is configured to provide a backend service for a predetermined application on the first terminal 120 and the parent application and the sub-application in the second terminal 160. The server cluster 140 has a data storage capability. In the embodiments of this application, the server cluster 140 includes: a parent application server 142, a sub-application server 144, and a third-party server 146.

The parent application server 142 is configured to provide a backend service for the parent application in the second terminal 160. For example, when the parent application is an instant messaging program, the parent application server 142 provides an instant messaging service among a plurality of second terminals 160.

The sub-application server 144 is configured to provide a backend service for the development tool of the sub-application in the first terminal 120 and the sub-application in the second terminal 160.

The third-party server 146 is configured to provide a backend service for the third-party development tool in the first terminal 120.

In this embodiment, an example in which the server cluster 140 includes three servers is used for description. The three servers may also be deployed in a form of a cloud server. However, the quantity of servers included in the server cluster 140 may also be greater than or less than three. For example, the server cluster 140 is implemented by a plurality of virtual machines on one server, or implemented by dozens of servers. This is not limited in the embodiments of this application.

Figure 3:
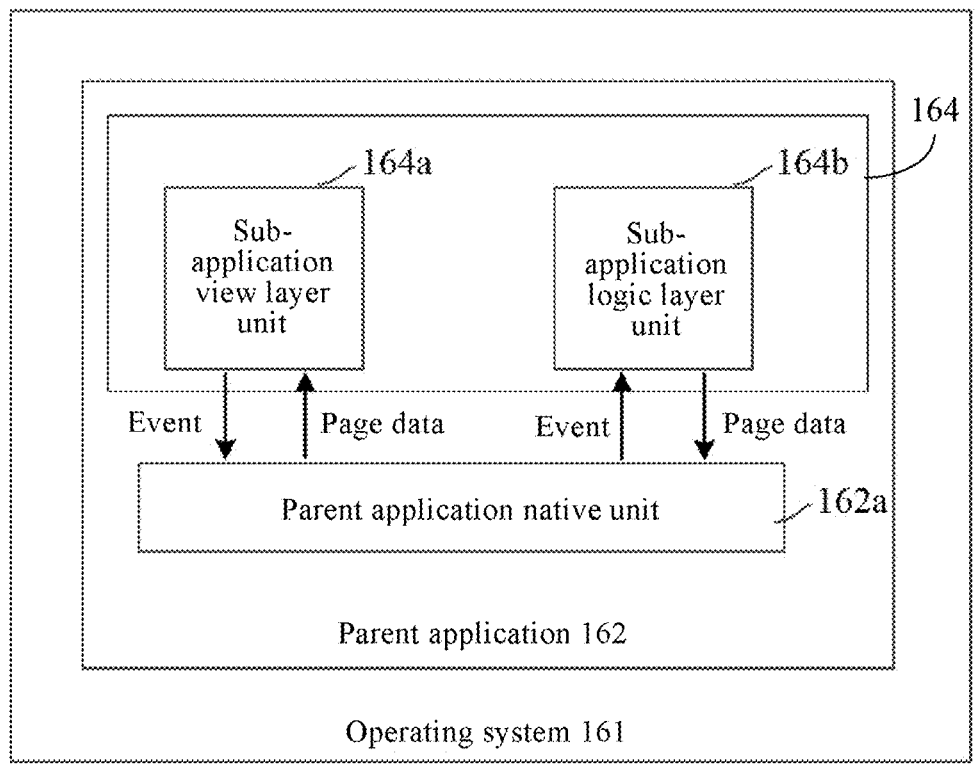
FIG. 3 is a schematic structural diagram of a second terminal according to an exemplary embodiment of this application.

With reference to a structure of the second terminal shown in FIG. 3, it may be learned that the operating system 161 is a computer program managing and controlling hardware and software resources in the second terminal 160, and is the most basic system software directly run on the bare-metal second terminal 160. An application needs to be run under the support of the operating system 161. The operating system 161 may be a desktop operating system such as a Windows operating system, a Linux operating system, or a Mac OS (an Apple desktop operating system), or may be a mobile operating system such as an iOS (an Apple mobile terminal operating system) or an Android operating system.

The parent application 162 is an application used for carrying the sub-application 164, and provides an environment for implementing the sub-application 164. The parent application 162 is a native application. The native application is an application that may be directly run on the operating system 161. The parent application 162 may be a social application, a dedicated application specially supporting the sub-application 164, a file management application, a mail application, a game application, or the like. The social application includes an instant messaging application, a social network service (SNS) application, a live streaming application, or the like. The sub-application 164 is an application that may be run in an environment provided by the parent application. The sub-application 164 may be specifically a social application, a file management application, a mail application, a game application, or the like. The parent application 162 may be specifically a WeChat program, and the corresponding sub-application 164 may be referred to as an applet.

A sub-application logic layer unit 164*b* and a corresponding sub-application view layer unit 164*a* are configured to implement a sub-application instance. One sub-application 164 may be implemented by one sub-application logic layer unit 164*b* and at least one sub-application view layer unit 164*a*. The sub-application view layer unit 164*a* and a sub-application page may be in a one-to-one correspondence.

The sub-application view layer unit 164*a* is configured to organize and render a view of the sub-application 164. The sub-application logic layer unit 164*b* is configured to process data processing logic of the sub-application 164 and a corresponding sub-application page. A unit may be specifically a process or a thread. For example, the sub-application view layer unit 164*a* is a sub-application view layer thread, and the sub-application logic layer unit 164*b* is a sub-application logic layer thread. The sub-application logic layer unit 164*b* may be run in a virtual machine. The sub-application view layer unit 164*a* and the sub-application logic layer unit 164*b* may transfer communication by using a parent application native unit 162*a*. The parent application native unit 162*a* is an interface for communication between the parent application 162 and the sub-application 164. The parent application native unit 162*a* may be a thread or a process of the parent application 162. A page logic code that is of each sub-application page and that falls within a program package may be registered when the sub-application logical layer unit 164*b* is started, and a registered page logic code is executed when the page logic code is needed to process data.

Figure 4:
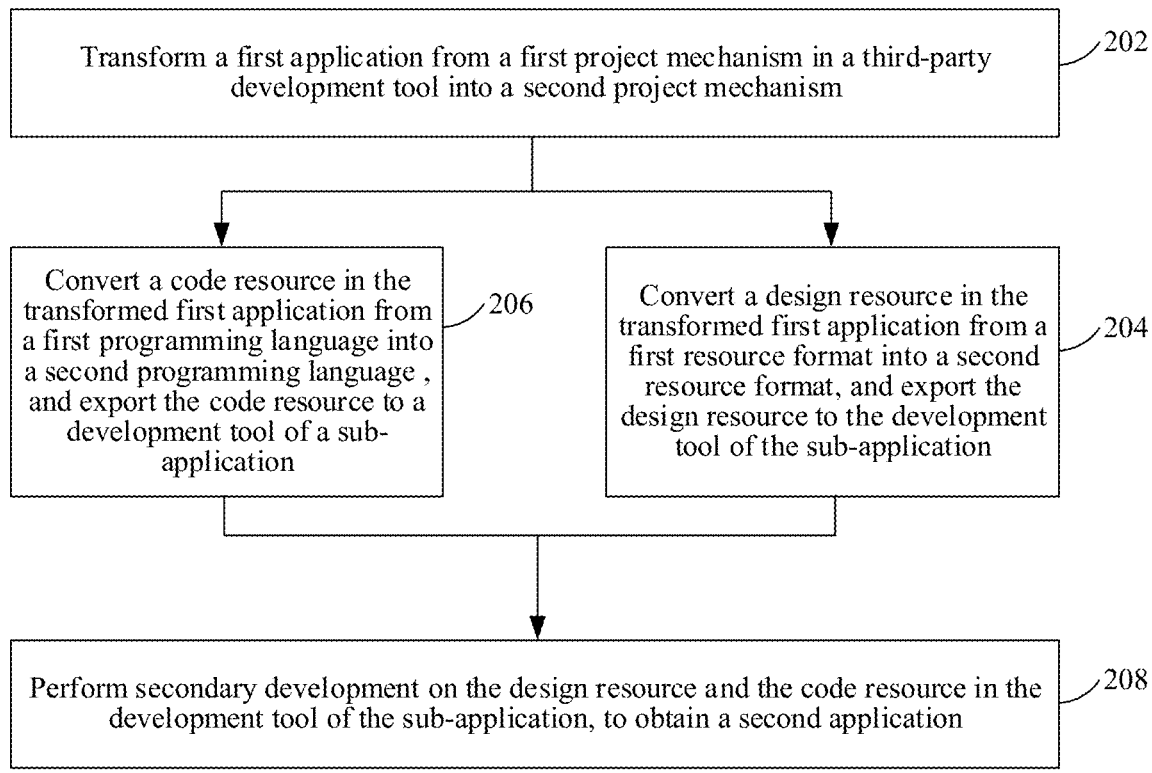
FIG. 4 is a flowchart of an application porting method according to an exemplary embodiment of this application.

FIG. 4 is a flowchart of an application porting method according to an exemplary embodiment of this application. In some embodiments, the application porting method is also known as an application migration method. The method may be applied to the first terminal 120 shown in FIG. 1. The method is used for porting (e.g., migrating) a first application into a second application. The second application is a sub-application that depends on a parent application to run. The method includes the following steps.

Step 202: Transform the first application from a first project mechanism in a third-party development tool into a second project mechanism.

In the embodiments of this application, the project mechanism may be an operating mechanism of the application. The first project mechanism is a project mechanism corresponding to the third-party development tool. The second project mechanism is a project mechanism corresponding to the sub-application. In the embodiments of this application, the first application is an application developed by the third-party development tool and related to a virtual environment. For example, the first application is an educational application or a military simulation application. In the embodiments of this application, the first application provides a virtual environment.

Figure 5:
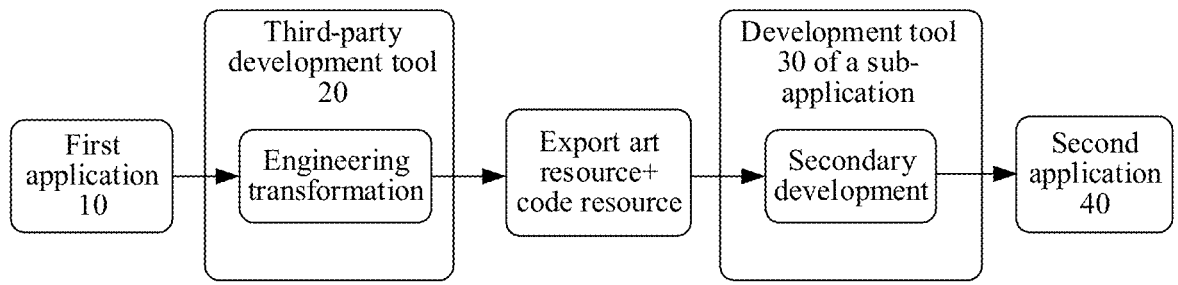
FIG. 5 is a schematic diagram of a principle of an application porting method according to an exemplary embodiment of this application.

With reference to the application porting method shown in FIG. 5, it may be learned that the developer performs engineering transformation on the first application 10 in the third-party development tool 20. The first application 10 is transformed from the project mechanism, corresponding to the third-party development tool 20, to the project mechanism that corresponds to the sub-application.

Step 204: Convert a design resource in the transformed first application from a first resource format into a second resource format, and export the design resource to a development tool of the sub-application.

The first resource format is a resource format corresponding to the third-party development tool. The second resource format is a resource format corresponding to the development tool of the sub-application.

Step 206: Convert a code resource in the transformed first application from a first programming language into a second programming language, and export the code resource to the development tool of the sub-application.

The first programming language is a programming language, for example, a C#language, corresponding to the third-party development tool. The second programming language is a programming language, for example, a JavaScript™ (JS) script language, corresponding to the sub-application.

Step 208: Perform secondary development on the design resource and the code resource in the development tool of the sub-application, to obtain the second application.

In the embodiments of this application, the design resource refers to an art resource in the application (for example, a game). With reference to FIG. 5, it may be learned that the developer exports the "art resource+code resource" from the third-party development tool 20 by performing the engineering transformation on the first application 10 in the third-party development tool 20, and then imports the "art resource+code resource" to the development tool 30 of the sub-application. Then, secondary development is performed on the "art resource+code resource" in the development tool 30 of the sub-application, to obtain a second application 40.

Base on the above, in the method provided in this embodiment, by first performing the engineering transformation on the first application in the third-party development tool, and then exporting the design resource and the code resource in the transformed first application to the development tool of the sub-application, the secondary development may be performed on the design resource and the code resource in the development tool of the sub-application, to obtain the second application. With the method provided in this embodiment, development work of the first application developed in the third-party development tool can be reused, and there is no need to restart a development process with more repetitive work. In this way, not only workload of the developer can be saved, but also a large quantity of existing applications can be rapidly ported to the applet platform, thereby saving device resources for applet development.

In the following embodiments, an example in which the third-party development tool is a Unity engine, the sub-application is a small game (e.g., mini game), and the parent application is an instant messaging program (for example, WeChat) is used for description, but specific types of the three are not limited.

Figure 6:
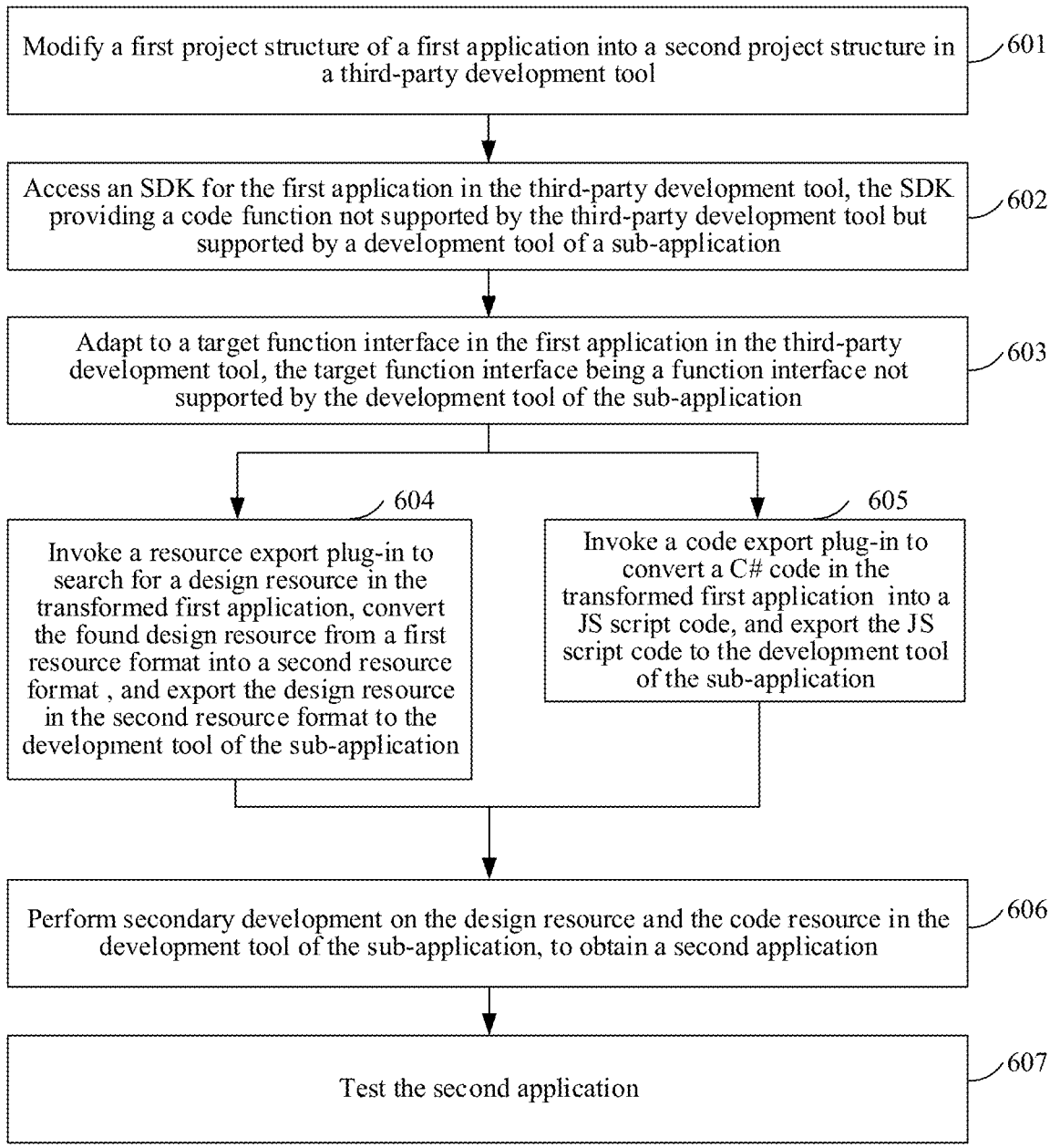
FIG. 6 is a flowchart of an application porting method according to another exemplary embodiment of this application.

FIG. 6 is a flowchart of an application porting method according to an exemplary embodiment of this application. The method may be applied to the computer system 100 shown in FIG. 1, and performed by the first terminal 120 in the computer system 100. The method is used for porting a first application to a second application. The second application is a sub-application depending on a parent application to run. The method includes the following steps.

Step 601: Modify a first project structure of the first application into a second project structure in the third-party development tool.

The developer reconfigures the first project structure of the first application through engineering transformation in the Unity engine, and modifies the first project structure into the second project structure corresponding to the applet.

In the embodiments of this application, the project structure may be a program structure of the application. The program structure of the application may include a programmatic directory configuration. For example, the program structure includes but not limited to at least one of a root directory, a resource folder, a library folder, a program settings folder, a temporary folder, a configuration folder, an editor class storage folder, an external library file storage directory, an art resource storage folder, a material ball folder, a model folder, an animation file folder, a sound folder, a map folder, a user interface folder, a third-party package folder, a scene file storage directory, or a script storage directory.

Using an example in which the third-party development tool is a Unity engine, the first application developed by the Unity engine is usually a client game, and the art resource and the code resource required by the client game are both stored in the first terminal. The small game is usually an online game, and the art resource and the code resource required for the small game are stored on the sub-application server, and loaded and run in real time by the second terminal. The operating mechanisms of the two are quite different. Therefore, adaptive modification, that is, engineering transformation, needs to be performed on the program structure in the Unity.

In the embodiments of this application, the developer further installs three plug-ins: a resource export plug-in, a code export plug-in, and a software development kit (SDK) in the third-party development tool. The resource export plug-in is used for exporting the art resource. The code export plug-in is used for exporting the code resource. The SDK is used for providing a code function not supported by the third-party development tool but supported by the sub-application.

Step 602: Access the SDK for the first application in the third-party development tool, the SDK providing a code function not supported by the third-party development tool but supported by the development tool of the sub-application.

The third-party development tool and the development tool of the sub-application are different. Therefore, there are some code functions not supported by the third-party development tool but supported by the sub-application. The code functions specific to the sub-application are provided by the SDK in the third-party development tool.

The developer uses the SDK in the third-party development tool, and adds the code function uniquely supported by the sub-application to the first application. In the embodiments of this application, the SDK is written by using a programming language, for example, C #SDK, supported by the third-party development tool.

In the embodiments of this application, the code function supported by the SDK includes a resource asynchronous loading function. The resource asynchronous loading function is a function that enables the applet to dynamically load a resource as the use of the user during operation.

Step 603: Adapt to a target function interface in the first application in the third-party development tool, the target function interface being a function interface not supported by the development tool of the sub-application.

The third-party development tool and the development tool of the sub-application are different. Therefore, there are some function interfaces supported by the third-party development tool but not supported by the sub-application. Adaptation needs to be performed on the target function interfaces specific to the third-party development tool.

In an adaptation manner, a code related to the target function interface may be deleted. In another adaptation manner, an adaptation function interface matching the target function interface may be newly developed in the sub-application.

In some embodiments, step 602 and step 603 may be optional.

Step 604: Invoke the resource export plug-in to search for the design resource in the transformed first application, convert the found design resource from the first resource format into the second resource format, and export the design resource in the second resource format to the development tool of the sub-application.

In the embodiments of this application, the first resource format is a resource format supported in the Unity engine. The second resource format is a resource format supported by the development tool of the sub-application.

The resource export plug-in is used for searching for and traversing the design resource, that is, the art resource, in the transformed first application. The art resource includes at least one of a scene resource (e.g., from a scene of the game), a model resource, a material resource, a serialized attribute resource, a building resource, a game character resource, or an animation resource. The scene resource includes at least one of a terrain resource, a lake resource, a tree resource, a vegetation resource, a light source resource, a shadow resource, or a static scene resource.

After the resource export plug-in is invoked to find all the art resources, format conversion is performed on each art resource, and all art resources after the format conversion are packaged into a format that the sub-application platform can recognize, for example, a mgepackage format. The format is exported to the development tool of the sub-application.

Step 605: Invoke the code export plug-in to convert a C #code in the transformed first application into a JS script code, and export the JS script code to the development tool of the sub-application.

The code export plug-in is used for exporting the C #code in the transformed first application, and after the exported C #code is converted into the JS script code, exporting the JS script code to the development tool of the sub-application.

In the embodiments of this application, for the C #code in the transformed first application, the code export plug-in can directly export the C #code.

In the embodiments of this application, for a plug-in without a source code (that is, an external plug-in without the C#code) in the transformed first application, the code export plug-in generates a stub code without the plug-in without a source code. The stub code is a JavaScript™ code used for replacing the plug-in without a source code.

Step 606: Perform secondary development on the design resource and the code resource in the development tool of the sub-application, to obtain the second application.

In the embodiments of this application, the development tool of the sub-application is installed with a JS adapter plug-in. After the C #code is ported to the JS script code, the C #code cannot be completely run. A bridging layer is further needed. The JS adapter functions as the bridging layer. The JS adapter includes but not limited to: a bridging adapter related to a system capability, a bridging adapter related to a performance tool, and a bridging adapter related to a math library.

In some embodiments, this step includes: invoking the JS adapter plug-in to bridge a C #interface supported by the C #code in the third-party development tool to a JS interface of the same type that is supported by the JS script, to obtain the second application.

In the embodiments of this application, the development tool of the sub-application is installed with a performance tool. This step further includes: invoking the performance tool to perform performance tuning on the JS script code, to obtain the second application.

Step 607: Test the second application.

A real machine test and a stability test are performed on the second application. After the tests pass, the second application is submitted to the server of the sub-application for review and release.

Based on the above, in the method provided in this embodiment, by first performing the engineering transformation on the first application in the third-party development tool, and then exporting the design resource and the code resource in the transformed first application to the development tool of the sub-application, the secondary development may be performed on the design resource and the code resource in the development tool of the sub-application, to obtain the second application. With the method provided in this embodiment, development work of the first application developed in the third-party development tool can be reused, and there is no need to restart a development process with more repetitive work. In this way, not only workload of the developer can be saved, but also a large quantity of existing applications can be rapidly ported to the applet platform, thereby saving device resources for applet development.

In the method provided in this embodiment, the SDK is provided for implementing the code function not supported by the third-party development tool but supported by the development tool of the sub-application, which can better adapt to the difference between two development tools, thereby introducing the code function supported by the development tool of the sub-application on an original basis.

In the method provided in this embodiment, the function interface supported by the third-party development tool but not supported by the development tool of the sub-application is implemented through adaptation, which can better adapt to the difference between two development tools, thereby deleting or modifying the function interface supported only by the third-party development tool.

In the method provided in this embodiment, by introducing the performance tool of the applet during the secondary development, performance of the ported applet can be ensured.

Figure 7:
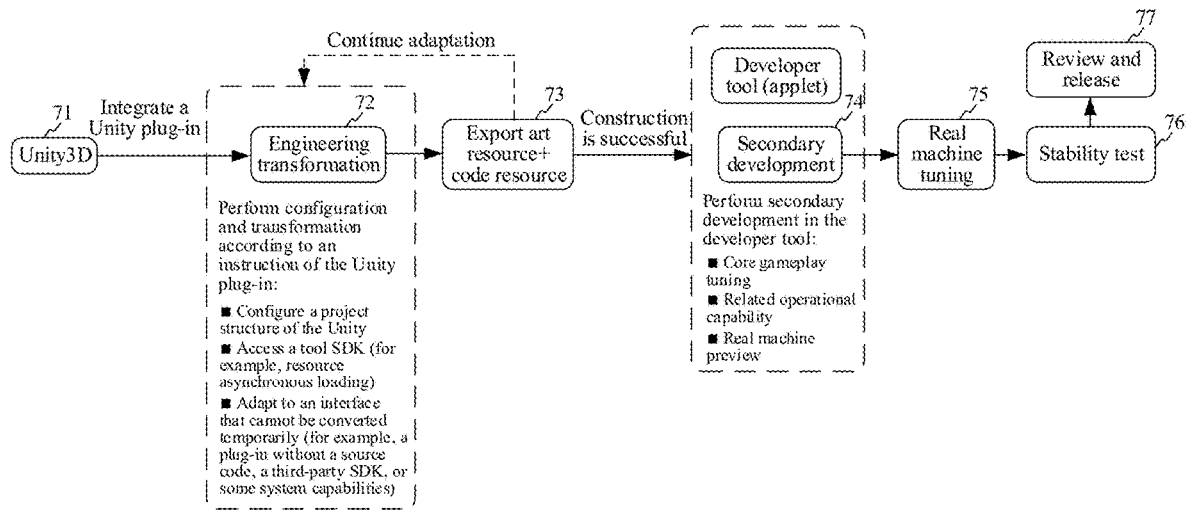
FIG. 7 is a schematic diagram of a principle of an application porting method according to an exemplary embodiment of this application.
Figure 8:
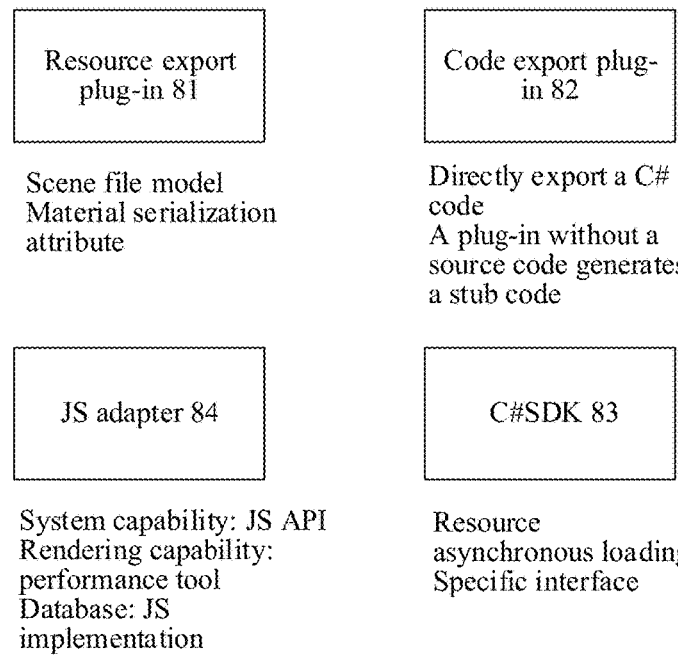
FIG. 8 is a schematic diagram of three types of plug-ins and an SDK according to an exemplary embodiment of this application.

In a schematic example, as shown in FIG. 7, the third-party development tool 71 is a Unity3D. The developer integrates three Unity plug-ins in the Unity3D: a resource export plug-in 81, a code export plug-in 82, and a tool SDK 83 (for example, C #SDK), as shown in FIG. 8. The resource export plug-in 81 is used for exporting a scene file model, a material serialization attribute, and the like. The code export plug-in 82 directly exports the plug-in without a source code in the first application to generate a stub code. Moreover, the tool SDK 83 has a unique resource asynchronous loading interface. Then step 72 is performed to perform engineering transformation on the first application in the Unity3D. The developer performs configuration and transformation according to an instruction of the Unity plug-in. The engineering transformation refers to modifying the operating mechanism of the application, for example, modifying the program structure of the application. The engineering transformation process includes but not limited to at least one of the following three steps:

1. Configure a project structure of the Unity; and
   reconfigure the project structure of the Unity according to the project structure of the applet.
2. Access the tool SDK, where
   the tool SDK is used for providing the unique code function of the applet, for example, resource asynchronous loading.
3. Adapt to an interface that cannot be converted temporarily,
   for example, adapt to the plug-in without a source code, a third-party SDK, or some system capabilities.

Still referring to FIG. 7, step 73: Export the art resource and the code resource of the first application. If all the art resources and code resources cannot be exported, adaptation needs to be continued.

Step 74: Perform secondary development on the design resource and the code resource in a developer tool, to obtain the second application.

The secondary development includes but not limited to at least one of core gameplay tuning, development of a related operational capability, or real machine preview development. The core gameplay tuning includes using the performance tool to optimize operating performance of the second application. The development of a related operational capability includes the development of an account login, ranking calculation, friend recommendation, and another capability related to the operation. The real machine preview development includes running the second application on a real electronic device for testing and tuning.

In some embodiments, and as shown in FIG. 8, the developer tool includes a JS adapter 84. The JS adapter 84 is configured to implement adaptation on a system capability, a rendering capability, and a database. The system capability may be provided by a JS application programming interface (API) in the JS adapter 84. The rendering capability may be provided by a performance tool in the JS adapter 84. The database may be provided by a JS script code in the JS adapter 84.

Still referring to FIG. 7, step 75: Perform a real machine test on the second application.

Step 76: Perform a stability test on the second application.

Step 77: Review and release the second application.

Figure 9:
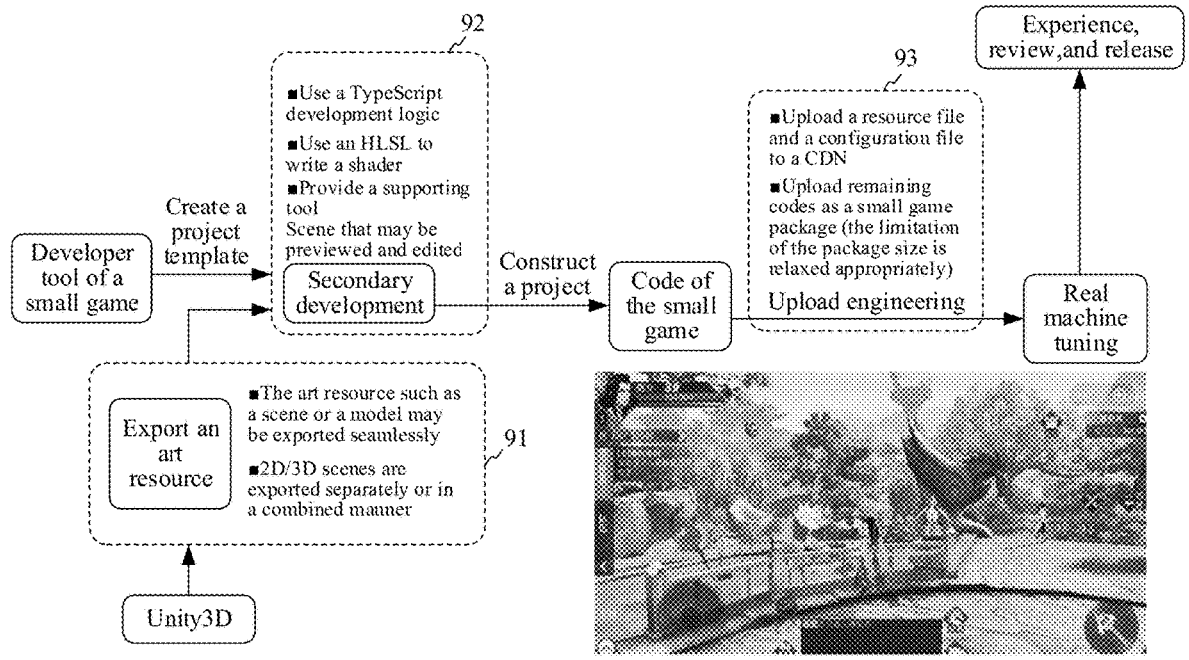
FIG. 9 is a schematic diagram of a principle of an application porting method according to an exemplary embodiment of this application.

In a schematic example, for the process of exporting the art resource, reference may be made to FIG. 9.

Step 91: Export the art resource.

In the embodiments of this application, the art resource such as the scene or the model may be exported seamlessly. Two-dimensional (2D)/three-dimensional (3D) scenes may be exported separately or in a combined manner.

Step 92: Perform secondary development on the design resource and the code resource.

When the secondary development is performed on the art resource and the code resource, a TypeScript development logic is used for the development. The TypeScript is a superset of the JS. A high level shader language (HLSL) is used for writing a shader. A supporting tool is provided in a development tool of a small game, and a scene may be previewed and edited, to construct and obtain a small game code.

Step 93: Upload engineering.

Code engineering of the small game code is uploaded to a platform server of the small game. For example, a resource file and a configuration file are uploaded to a content delivery network (CDN) in the platform server, and a code file is uploaded to the platform server of the small game in a form of a small game package. In the embodiments of this application, the platform server does not strictly limit a package size of the small game package. Generally, the package size of the small game package may be appropriately adjusted according to a processing capability of the platform server and a network resource status.

Figure 10:
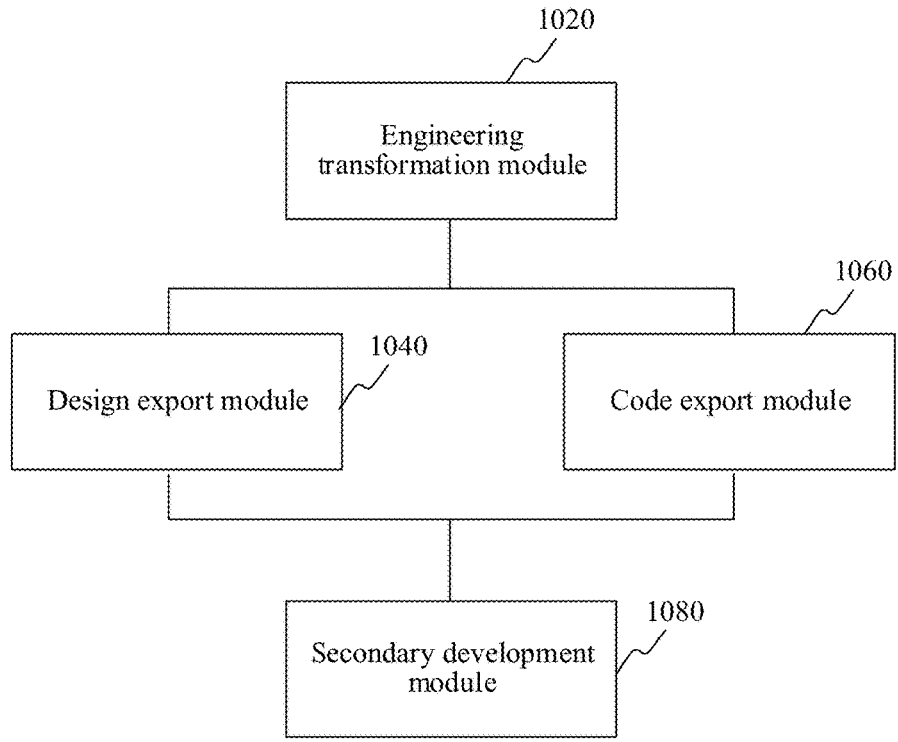
FIG. 10 is a block diagram of an application porting apparatus according to another exemplary embodiment of this application.

FIG. 10 is a block diagram of an application porting apparatus according to an exemplary embodiment of this application. The apparatus may be implemented as a computer device or may be applied to a computer device. The apparatus is configured to port a first application to a second application. The second application is a sub-application depending on a parent application to run. The apparatus includes:

a transformation module 1020, configured to transform the first application into a second project mechanism from a first project mechanism in a third-party development tool;

a design export module 1040, configured to convert a design resource in the transformed first application into a second resource format from a first resource format, and export the design resource to a development tool of the sub-application;

a code export module 1060, configured to convert a code resource in the transformed first application into a second programming language from a first programming language, and export the code resource to the development tool of the sub-application; and a secondary development module 1080, configured to perform secondary development on the design resource and the code resource in the development tool of the sub-application, to obtain the second application, the first project mechanism, the first resource format, and the first programming language corresponding to the third-party development tool, and the second project mechanism, the second resource format, and the second programming language corresponding to the sub-application.

In an embodiment of this application, the transformation module 1020 is configured to modify a first project structure of the first application into a second project structure in the third-party development tool. The first project structure is a project structure adapted to the third-party development tool, and the second project structure is a project structure adapted to the development tool of the sub-application.

In an embodiment of this application, the transformation module 1020 is configured to access an SDK for the first application in the third-party development tool, the SDK providing a code function not supported by the third-party development tool but supported by the development tool of the sub-application.

In an embodiment of this application, the transformation module 1020 is configured to adapt to a target function interface in the first application in the third-party development tool, the target function interface being a function interface not supported by the development tool of the sub-application.

In an embodiment of this application, the third-party development tool is installed with a resource export plug-in. The design export module 1040 is configured to invoke the resource export plug-in to search for the design resource in the transformed first application, convert the found design resource into the second resource format from the first resource format, and export the design resource in the second resource format to the development tool of the sub-application.

In an embodiment of this application, the third-party development tool is installed with a code export plug-in. The code export module 1060 is configured to invoke the code export plug-in to convert a C #code in the transformed first application into a JS script code, and export the JS script code to the development tool of the sub-application.

In an embodiment of this application, the development tool of the sub-application is installed with a JS adapter plug-in. The secondary development module 1080 is configured to invoke the JS adapter plug-in to bridge a C #interface supported by the C #code to a JS interface of the same type that is supported by the JS script, to obtain the second application.

In an embodiment of this application, the development tool of the sub-application is installed with a performance tool. The secondary development module 1080 is configured to invoke the performance tool to perform performance tuning on the JS script code, to obtain the second application.

The application porting apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the application porting apparatus provided in the foregoing embodiments and the embodiments of the application porting method belong to the same concept. For a specific implementation process of the application porting apparatus, refer to the method embodiments, and details are not described herein again.

This application further provides a computer device (such as, a terminal or a server) including a processor and a memory, the memory storing at least one instruction, at least one segment of program, a code set, or an instruction set, the at least one instruction, the at least one segment of program, the code set, or the instruction set being loaded and executed by the processor to implement the application porting method provided in the foregoing method embodiments. In the embodiments of this application, the computer device may be a computer device provided in FIG. 11.

Figure 11:
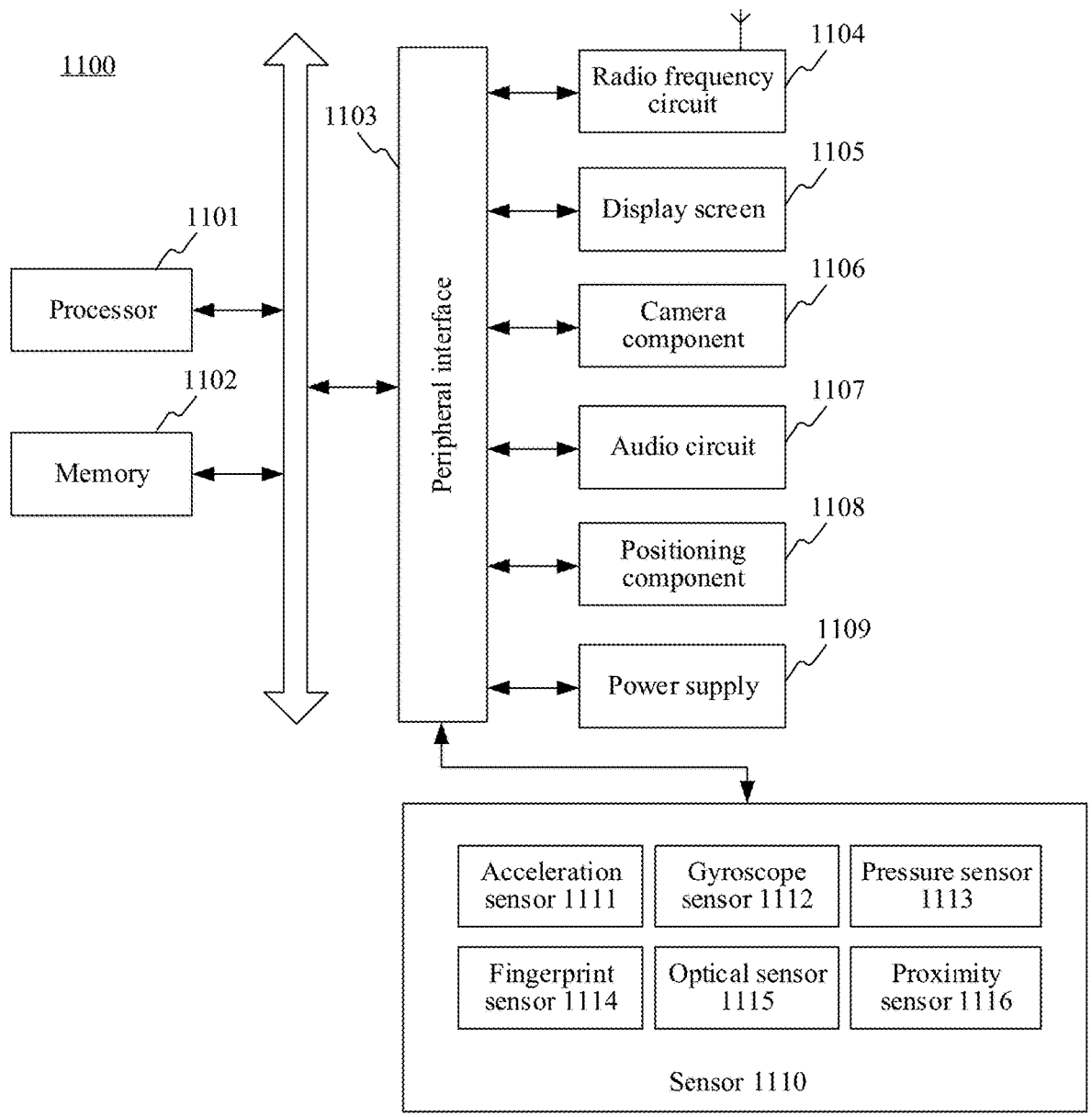
FIG. 11 is a block diagram of a computer device according to another exemplary embodiment of this application.

FIG. 11 is a structural block diagram of a computer device 1100 according to an exemplary embodiment of this application. The computer device 1100 may be a smartphone, a tablet computer, a MP3 player, a MP4 player, a notebook computer, or a desktop computer. The computer device 1100 may also be referred to as user equipment (UE), a portable computer device, a laptop computer device, a desktop computer device, or another name.

In the embodiments of this application, the computer device 1100 includes a processor 1101 and a memory 1102.

The processor 1101 may include one or more core processor, for example, a 4-core processor or an 8-core processor. The processor 1101 may be implemented by using at least one hardware form of a digital signal processor (DSP), a field-programmable gate array (FPGA), or a programmable logic array (PLA). The processor 1101 may alternatively include a main processor and a coprocessor. The main processor is configured to process data in an awake state, also referred to as a central processing unit (CPU); and The coprocessor is a low-power processor configured to process data in a standby state. In some embodiments, the processor 1101 may be integrated with a graphics processing unit (GPU). The GPU is configured to render and draw content that needs to be displayed on a display screen. In some embodiments, the processor 1101 may further include an AI processor. The AI processor is configured to process a computing operation related to machine learning.

The memory 1102 may include one or more computer-readable storage media. The computer-readable storage medium may be non-transient. The memory 1102 may further include a high-speed RAM, and a non-volatile memory such as one or more magnetic disk storage devices, a flash storage device, and the like. In some embodiments, the non-transient computer-readable storage medium in the memory 1102 is configured to store at least one instruction, at least one program, a code set, or an instruction set, the at least one instruction, the at least one program, the code set, or the instruction set being configured to be executed by the processor 1101 to implement the application porting method provided in the method embodiments of this application.

In some embodiments, the computer device 1100 further includes a peripheral interface 1103 and at least one peripheral. The processor 1101, the memory 1102, and the peripheral interface 1103 may be connected by using a bus or a signal cable. Each peripheral may be connected to the peripheral interface 1103 by using a bus, a signal cable, or a circuit board. Specifically, the peripheral includes at least one of a radio frequency (RF) circuit 1104, a display screen 1105 (for example, a touch display screen), a camera assembly 1106, an audio circuit 1107, a positioning component 1108, or a power supply 1109.

The peripheral interface 1103 may be configured to connect at least one peripheral related to input/output (I/O) to the processor 1101 and the memory 1102. In some embodiments, the processor 1101, the memory 1102, and the peripheral interface 1103 are integrated on the same chip or the same circuit board. In some other embodiments, any or both of the processor 1101, the memory 1102, and the peripheral interface 1103 may be implemented on an independent chip or circuit board. This is not limited in this embodiment.

The RF circuit 1104 is configured to receive and transmit an RF signal, which is also referred to as an electromagnetic signal. The RF circuit 1104 communicates with a communication network and other communication devices through the electromagnetic signal. The RF circuit 1104 converts an electrical signal into an electromagnetic signal for transmission, or converts a received electromagnetic signal into an electrical signal. In the embodiments of this application, the RF circuit 1104 includes: an antenna system, an RF transceiver, one or more amplifiers, a tuner, an oscillator, a digital signal processor, a codec chip set, a subscriber identity module card, and the like. The RF circuit 1104 may communicate with other computer devices through at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1104 may further include a circuit related to NFC. This is not limited in this application.

The display screen 1105 is configured to display a user interface (UI). The UI may include a graph, a text, an icon, a video, and any combination thereof. When the display screen 1105 is a touch display screen, the display screen 1105 further has a capability of acquiring a touch signal on or above a surface of the display screen 1105. The touch signal may be inputted to the processor 1101 as a control signal for processing. In this case, the display screen 1105 may be further configured to provide a virtual button and/or a virtual keyboard, which is also referred to as a soft button and/or a soft keyboard. In some embodiments, there may be one display screen 1105, disposed on a front panel of the computer device 1100. In some other embodiments, there may be at least two display screens 1105, disposed on different surfaces of the computer device 1100 respectively or in a folded design. In some embodiments, the display screen 1105 may further be a flexible display screen, disposed on a curved surface or a folded surface of the computer device 1100. In some embodiments, the display screen 1105 may be further set to have a non-rectangular irregular pattern, that is, a special-shaped screen. The display screen 1105 may be prepared by using materials such as a liquid crystal display (LCD), an organic light-emitting diode (OLED), or the like.

A camera component 1106 is configured to collect an image or a video. In the embodiments of this application, the camera assembly 1106 includes a front-facing camera and a rear-facing camera. Generally, the front-facing camera is disposed on the front panel of the computer device, and the rear-facing camera is disposed on a back face of the computer device. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 1106 may further include a flash. The flash may be a single color temperature flash or a double color temperature flash. The double color temperature flash refers to a combination of a warm light flash and a cold light flash, and may be used for light compensation under different color temperatures.

The audio circuit 1107 may include a microphone and a speaker. The microphone is configured to collect sound waves of users and surroundings, and convert the sound waves into electrical signals and input the signals to the processor 1101 for processing, or input the signals to the RF circuit 1104 to implement voice communication. For the purpose of stereo sound acquisition or noise reduction, there may be a plurality of microphones, respectively disposed at different parts of the computer device 1100. The microphone may be further a microphone array or an omnidirectional collection microphone. The speaker is configured to convert electric signals from the processor 1101 or the RF circuit 1104 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1107 may also include an earphone jack.

The positioning component 1108 is configured to determine a current geographic location of the computer device 1100 through positioning, to implement navigation or a location based service (LBS). The positioning component 1108 may be a positioning assembly based on the Global Positioning System (GPS), the Beidou Navigation Satellite System (BDS), or the Galileo system.

The power supply 1109 is configured to supply power to components in the computer device 1100. The power supply 1109 may be an alternating current, a direct current, a primary battery, or a rechargeable battery. When the power supply 1109 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the computer device 1100 may further include one or more sensors 1110. The one or more sensors 1110 include, but are not limited to: an acceleration sensor 1111, a gyro sensor 1112, a pressure sensor 1113, a fingerprint sensor 1114, an optical sensor 1115, and a proximity sensor 1116.

The acceleration sensor 1111 may detect accelerations on three coordinate axes of a coordinate system established by the computer device 1100. For example, the acceleration sensor 1111 may be configured to detect components of gravity acceleration on the three coordinate axes. The processor 1101 may control, according to a gravity acceleration signal acquired by the acceleration sensor 1111, the touch display screen 1105 to display the UI in a frame view or a portrait view. The acceleration sensor 1111 may be further configured to acquire motion data of a game or a user.

The gyroscope sensor 1112 may detect a body direction and a rotation angle of the computer device 1100. The gyroscope sensor 1112 may cooperate with the acceleration sensor 1111 to collect a 3D action by the user on the computer device 1100. The processor 1101 may implement the following functions according to the data acquired by the gyroscope sensor 1112: motion sensing (such as changing the UI according to a tilt operation of the user), image stabilization during shooting, game control, and inertial navigation.

The pressure sensor 1113 may be disposed on a side frame of the computer device 1100 and/or a lower layer of the touch display screen 1105. When the pressure sensor 1113 is disposed on the side frame of the computer device 1100, a holding signal of the user on the computer device 1100 may be detected. The processor 1101 performs left and right hand recognition or a quick operation according to the holding signal collected by the pressure sensor 1113. When the pressure sensor 1113 is disposed at the low layer of the touch display screen 1105, the processor 1101 controls, according to a pressure operation of the user on the touch display screen 1105, an operable control on the UI. The operable control includes at least one of a button control, a scroll-bar control, an icon control, or a menu control.

The fingerprint sensor 1114 is configured to acquire a user's fingerprint, and the processor 1101 identifies a user's identity according to the fingerprint acquired by the fingerprint sensor 1114, or the fingerprint sensor 1114 identifies a user's identity according to the acquired fingerprint. When identifying that the user's identity is a trusted identity, the processor 1101 authorizes the user to perform related sensitive operations. The sensitive operations include: unlocking a screen, viewing encrypted information, downloading software, paying, changing a setting, and the like. The fingerprint sensor 1114 may be disposed on a front face, a back face, or a side face of the computer device 1100. When a physical button or a vendor logo is disposed on the computer device 1100, the fingerprint sensor 1114 may be integrated together with the physical button or the vendor logo.

The optical sensor 1115 is configured to acquire ambient light intensity. In an embodiment, the processor 1101 may control display brightness of the display screen 1105 according to the ambient light intensity acquired by the optical sensor 1115. Specifically, when the ambient light intensity is relatively high, the display brightness of the touch display 1105 is increased. When that the ambient light intensity is relatively low, the display brightness of the touch display screen 1105 is reduced. In another embodiment, the processor 1101 may further dynamically adjust a camera parameter of the camera component 1106 according to the ambient light intensity acquired by the optical sensor 1115.

The proximity sensor 1116, also referred to as a distance sensor, is usually disposed on the front panel of the computer device 1100. The proximity sensor 1116 is configured to acquire a distance between a front face of the user and the front face of the computer device 1100. In an embodiment, when the proximity sensor 1116 detects that the distance between the user and the front surface of the computer device 1100 gradually becomes small, the touch display 1101 is controlled by the processor 1105 to switch from a screen-on state to a screen-off state. When the proximity sensor 1116 detects that the distance between the user and the front surface of the computer device 1100 gradually becomes large, the touch display 1101 is controlled by the processor 1105 to switch from the screen-off state to the screen-on state.

A person skilled in the art may understand that the structure shown in FIG. 11 does not constitute any limitation on the computer device 1100. In another embodiment, the computer device may include more components or fewer components than those shown in the figure, or some components may be combined, or a different component deployment may be used.

The memory further includes one or more programs. The one or more programs are stored in the memory. The one or more programs include a program for performing the application porting method provided in the embodiments of this application.

The embodiments of this application further provide a non-transitory computer-readable storage medium, the storage medium storing at least one instruction, the at least one instruction being loaded and executed by a processor to implement the application porting method according to the foregoing method embodiments.

The embodiments of this application further provide a computer program product, configured to: when executed on a data processing system including a processor and a memory, cause the data processing system to perform the method of the foregoing embodiments. For example, the computer program product, when run on a computer, causes the computer to perform the application porting method according to the foregoing method embodiments. The computer program product may be provided on a tangible non-transitory computer-readable medium.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented a program instructing related hardware. The program may be stored in a computer-readable storage medium (e.g., non-transitory computer-readable storage medium). The storage medium may be: a read-only memory, a magnetic disk, or an optical disc.

The foregoing descriptions are merely embodiments of this application, but are not intended to limit this application. Any modification, equivalent replacement, and improvement made without departing from the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs transformation and/or design and/or code export. In practical application, the foregoing functions may be allocated to and completed by different functional modules according to requirements, that is, an inner structure of a device is divided into different functional modules to implement all or a part of the functions described above.

What is claimed is:

1. A method for porting a first application into a second application performed by an electronic device, wherein the first application corresponds to a third-party development tool and the second application is a sub-application that executes on a social networking platform, the method comprising:
    transforming the first application from a first operating mechanism corresponding to the third-party development tool into a second operating mechanism corresponding to the sub-application, wherein the first operating mechanism allows the first application to operate in an offline mode and the second operating mechanism requires that the sub-application operates in an online mode only;
    converting a design resource in the transformed first application from a first resource format corresponding to the third-party development tool into a second resource format corresponding to the social networking platform and a code resource in the transformed first application from a first programming language corresponding to the third-party development tool into a second programming language corresponding to the social networking platform, respectively;
    exporting the converted design resource and the converted code resource to a development tool of the second application on the social networking platform; and
    performing secondary development on the design resource and the code resource in the development tool of the sub-application, to obtain the second application corresponding to the social networking platform.

2. The method according to claim 1, wherein the first resource format and the first programming language correspond to the third-party development tool, and the second resource format and the second programming language correspond to the sub-application.

3. The method according to claim 1, wherein the method further comprises:
    adapting a target function interface of the first application in the third-party development tool to be supported by the social network platform.

4. The method according to claim 1, wherein the converting and exporting of the design resource further comprise:
    searching for the design resource in the first application;
    converting the found design resource from the first resource format into the second resource format; and
    exporting the design resource in the second resource format to the second application.

5. The method according to claim 1, wherein the converting and exporting of the code resource further comprise:
    converting a C#code in the first application into a JavaScript™ (JS) script code; and
    exporting the JS script code to the second application.

6. An electronic device comprising:
    one or more processors; and
    memory storing one or more programs that, when executed by the one or more processors, cause the electronic device to perform a method for porting a first application into a second application, wherein the first application corresponds to a third-party development tool and the second application is a sub-application that executes on a social networking platform, including:
    transforming the first application from a first operating mechanism corresponding to the third-party development tool into a second operating mechanism corresponding to the sub-application, wherein the first operating mechanism allows the first application to operate in an offline mode and the second operating mechanism requires that the sub-application operates in an online mode only;
    converting a design resource in the transformed first application from a first resource format corresponding to the third-party development tool into a second resource format corresponding to the social networking platform and a code resource in the transformed first application from a first programming language corresponding to the third-party development tool into a second programming language corresponding to the social networking platform, respectively;

exporting the converted design resource and the converted code resource to a development tool of the second application on the social networking platform; and performing secondary development on the design resource and the code resource in the development tool of the sub-application, to obtain the second application corresponding to the social networking platform.

7. The electronic device according to claim 6, wherein the first resource format and the first programming language correspond to the third-party development tool, and the second resource format and the second programming language correspond to the sub-application.

8. The electronic device according to claim 6, wherein the method further comprises:
adapting a target function interface of the first application in the third-party development tool to be supported by the social network platform.

9. The electronic device according to claim 6, wherein the converting and exporting of the design resource further comprise:
searching for the design resource in the first application;
converting the found design resource from the first resource format into the second resource format; and
exporting the design resource in the second resource format to the second application.

10. The electronic device according to claim 6, wherein the converting and exporting of the code resource further comprise:
converting a C#code in the first application into a JavaScript™ (JS) script code; and
exporting the JS script code to the second application.

11. A non-transitory computer-readable storage medium, storing a computer program that, when executed by one or more processors of an electronic device, cause the electronic device to perform a method for porting a first application into a second application, wherein the first application corresponds to a third-party development tool and the second application is a sub-application that executes on a social networking platform, including:
transforming the first application from a first operating mechanism corresponding to the third-party development tool into a second operating mechanism corresponding to the sub-application, wherein the first operating mechanism allows the first application to operate in an offline mode and the second operating mechanism requires that the sub-application operates in an online mode only;
converting a design resource in the transformed first application from a first resource format corresponding to the third-party development tool into a second resource format corresponding to the social networking platform and a code resource in the transformed first application from a first programming language corresponding to the third-party development tool into a second programming language corresponding to the social networking platform, respectively;
exporting the converted design resource and the converted code resource to a development tool of the second application on the social networking platform; and
performing secondary development on the design resource and the code resource in the development tool of the sub-application, to obtain the second application corresponding to the social networking platform.

12. The non-transitory computer-readable storage medium according to claim 11, wherein the first resource format and the first programming language correspond to the third-party development tool, and the second resource format and the second programming language correspond to the sub-application.

13. The non-transitory computer-readable storage medium according to claim 11, wherein the method further comprises:
adapting a target function interface of the first application in the third-party development tool to be supported by the social network platform.

14. The non-transitory computer-readable storage medium according to claim 11, wherein the converting and exporting of the design resource further comprise:
searching for the design resource in the first application;
converting the found design resource from the first resource format into the second resource format; and
exporting the design resource in the second resource format to the second application.

15. The non-transitory computer-readable storage medium according to claim 11, wherein the converting and exporting of the code resource further comprise:
converting a C#code in the first application into a JavaScript™ (JS) script code; and
exporting the JS script code to the second application.

* * * * *